Figure 1:
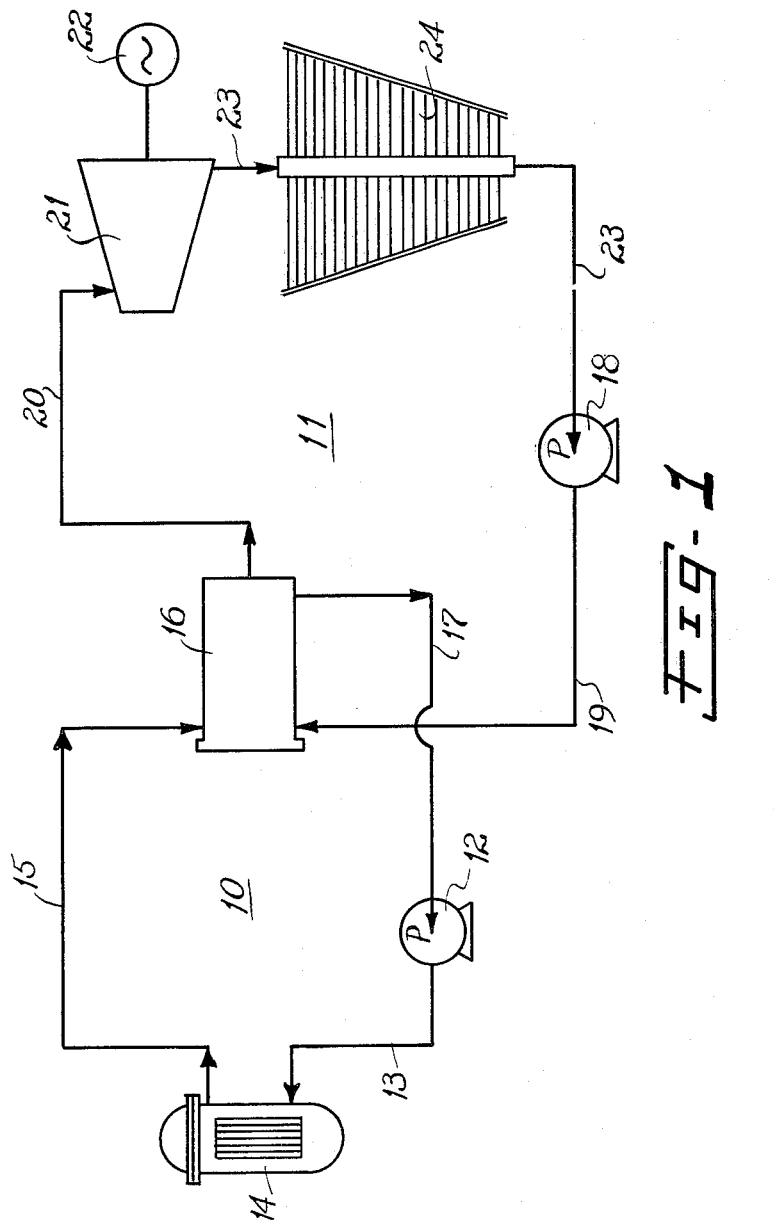

INVENTOR.
EDWIN F. FRICKE

United States Patent Office 3,164,957
Patented Jan. 12, 1965

3,164,957
THERMAL ENERGY CONVERTING SYSTEM
Edwin F. Fricke, Huntington, N.Y., assignor to Republic Aviation Corporation, Farmingdale, N.Y., a corporation of Delaware
Filed Mar. 10, 1961, Ser. No. 94,901
6 Claims. (Cl. 60—36)

This invention relates broadly to thermal energy converting systems and, more particularly, to a thermal energy converting system employing direct contact heat transfer, i.e., heat transfer is effected by directly and intimately intermixing the primary or heating and the secondary or working fluids.

The present invention contemplates a binary fluid system whereby selected fluids are circulated through separate loops wherein they are each subjected to thermal conditions to produce a desired heat differential, thereafter intimately intermixed by direct contact one with the other and subsequently separated into their respective loops for the transfer and conversion of thermal energy from a heat source in one loop to an electrical work load in the other loop.

Additionally, novel means is proposed and incorporated into the present system by which the primary and secondary fluids are brought together in intimate, direct contact and intermixed to effect the heat transfer operation and thereafter cause their separation and return to their respective loops. Thus, through cyclical action heat energy is transferred from the source to the electrical work load.

Among its other objects, the instant invention has in view a binary loop thermal energy converting system by which the secondary or working fluid may be superheated to thereby obtain maximum heat energy with an accompanying minimum pressure. At the same time, the heat transfer operation is substantially simplified to the end that the system is reliable over a relatively long life, handling extreme temperatures with maximum efficiency.

Heretofore, binary loop thermal energy converting systems have employed relatively low temperature primary fluids and the heat transfer operation has been effected by means of isolated, independent primary and secondary fluid loops wherein the two fluids are brought together into close proximity through a tubal heat exchanger. Depending upon the particular application and the thermal values involved, tubal heat exchangers of various designs have evolved. These prior devices, however, have common faults which for present and future purposes, such as high temperature operations (in the order of 1500° to 2500° F.), must be eliminated.

For example, in the high temperature heat transfer applications referred to above, the coils or tubes of conventional heat exchangers are usually lengthy, being disposed in multiple courses or windings that establish complex paths for the isolated fluids. Thus, difficult design and manufacturing problems arise since tubes, at best, are prone to stress corrosion, i.e., a structural breakdown under stresses, particularly when such stresses are cyclical. Reliability and life expectancy of such heat exchangers have thereby been greatly reduced.

Additionally, present day heat exchanger designs have limitations in heat transfer efficiencies. Due to losses attendant the heat transfer, unduly large heat sources are required to produce the desired, effective heat output. The best of the present day heat exchangers operate at about 80% heat transfer efficiency. With direct contact heating as proposed herein, substantially 100% heat transfer efficiency may be obtained. Thus, for the same output an appreciably smaller heat source is possible.

While the present invention is adapted for use generally in high temperature energy converting systems, such as the nuclear reaction type, and the heat transfer operation of such systems, it finds particular utility in space vehicles where light-weight systems are required, where the temperatures involved exceed those of other applications, where compensations must be made for the lack of gravity forces, where reliability requirements are more stringent, etc. By satisfying the comparatively greater demands of space applications, the instant system more than meets the relatively simple requirements of the several applications for this type of system within the earth's atmosphere.

Figure 2:
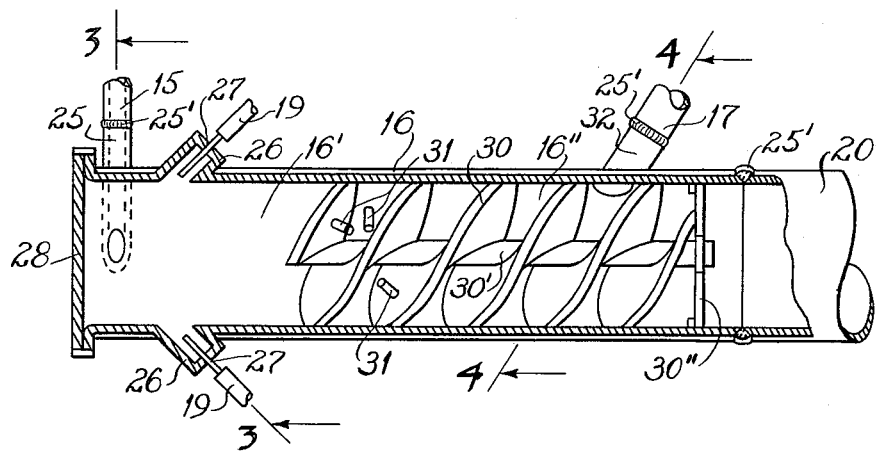
Figure 3:
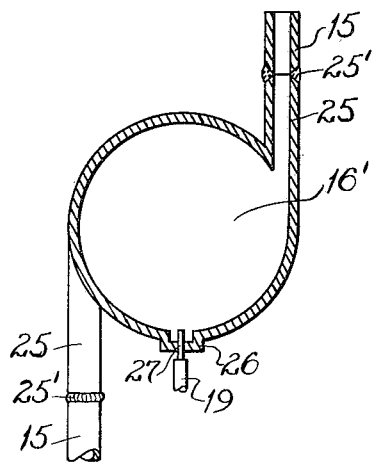
Figure 4:
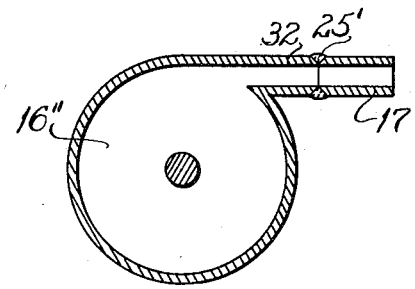

With the above and other objects in view, as will be apparent, this invention consists in the construction, combination and arrangement of parts all as hereinafter more fully described, claimed and illustrated in the accompanying drawings, wherein:

FIG. 1 is a schematic diagram of a thermal energy converting system constructed in accordance with the teachings of the present invention to show a binary fluid system, the primary and secondary loops of which are interconnected one with the other whereby their respective fluids are individually treated to obtain the desired heat differential, intimately and directly mixed during the heat transfer operation and recirculated to produce a cyclical operation;

FIG. 2 is a longitudinal view partly in section of the means shown generally in the system of FIG. 1 interconnecting the primary and secondary loops of the system where the fluids of these loops are sequentially mixed during the heat transfer operation and separated prior to recirculation in their respective loops;

FIG. 3 is a transverse section taken along line 3—3 of FIG. 2 to show the manner in which the primary and secondary fluids are brought together into intimate contact and mixed in the heat transfer operation; and FIG. 4 is a transverse section taken along line 4—4 of FIG. 2 to show the manner in which the primary and secondary fluids are separated after the heat transfer operation and returned to their respective loops for recirculation.

Referring more particularly to the drawings, the thermal energy converting system illustrated comprises a primary fluid loop 10 and a secondary fluid loop 11. A main coolant pump 12 is operatively connected in the primary loop 10 and delivers the fluid of the loop through a fluid line or conduit 13 to a suitable primary source of heat energy such as, for example, a nuclear reactor 14. The nuclear reactor is of conventional design, its function being merely to heat the fluid to the desired temperature. A fluid line 15 is connected to the reactor 14 and delivers the heated fluid from the reactor 14 to a heat transfer chamber, i.e., a combination vaporizer-separator unit 16. A return fluid line or conduit 17 is connected at one of its ends to the vaporizer-separator unit 16 and at its other end to the pump 12.

The secondary fluid loop 11 includes a condensate pump 18 adapted to force the fluid of the loop through a feeding conduit 19 to the vaporizer-separator 16 where it is intermixed with the primary fluid, as will be described, and the heat transfer thereby effected. A fluid line or conduit 20 is connected to the vaporizer-separator 16 and is adapted to deliver the secondary or working fluid thus heated to a vapor-driven turbine 21 operatively connected in conventional manner to electrical generating means such as a generator 22. A return line 23 connected to the turbine 21 delivers the vapor passing through the turbine to a radiator 24. Following conventional practice in space applications, the radiator 24 is mounted in the line 23 to effect an efficient condensation of turbine exhaust vapor and dissipation of heat of condensation of the fluid passing therethrough. Suitable power means (not shown) may be connected to the radiator 24 to rotate it and thus by centrifugal action compensate for any frictional and kinetic energy pressure losses of the fluid driving head of the condensing fluid as well as to facilitate in the dissipation of waste heat, especially for zero gravity operating conditions.

In order to permit the direct and intimate mixing of the primary and secondary fluids and the subsequent separation thereof as contemplated herein, substantially immiscible fluids are employed. To this end, the fluid of the main loop 10 is preferably a liquid selected from those having a relatively high boiling point, preferably an alkali metal such as lithium while the fluid of the secondary loop 11 is selected from those fluids having a relatively low boiling point, such as cesium. Hereinafter, all reference to the fluids will be lithium as the primary fluid and cesium as the secondary or working fluid, it being understood that these particular fluids are illustrative only.

It is to be understood that in space applications a condensible secondary fluid having low solubility in the primary fluid is preferred. Non-condensible secondary fluids or gases such as, for example, helium, which may be only slightly soluble in the selected primary fluid, such as lithium, would be used primarily for non-space applications.

The vaporizer-separator unit 16 is generally cylindrical, defining an internal chamber comprising a fluid mixing or boiling section 16' adjacent one of its ends and a fluid separating section 16" adjacent its other end. One or more ports 25 are provided in the unit 16 communicating with the fluid mixing section or vaporizer 16', each port being tangentially disposed thereto and connecting the lithium feed line 15. Preferably, each port 25 and associated line 15 terminates in a scarfed edge to facilitate the leakproof connection thereof, as by a weld 25', whereby the internal diameter of the port 25 and line 15 is the same.

A similarly disposed port or ports 26 are provided adjacent the ports 25 for connection to the cesium feed line 19, the ports 26 being located at selected angles relative to the ports 25. Each port 26 may be adapted to receive a nozzle 27 mounted on and carried by the line 19 at its associated end to insure a high velocity discharge of the cesium into the vaporizer 16'. Thus, the lithium and cesium entering the vaporizer 16' are insured of immediate, direct contact, and an initial turbulence is created.

A splash plate 28 closes the end of the unit 16 adjacent the ports 25 and 26 whereby both fluids entering the vaporizer 16' are deflected and the turbulence therein is aggravated for a more thorough mixing of the fluids. The temperature of the cesium is thus increased to approximately that of the lithium and the cesium, if liquid, begins to vaporize by receiving its heat of vaporization from the lithium.

When deflected from the splash plate 28, the mixed fluids pass from the vaporizer 16' into the fluid separating section 16" which comprises a spiral vane 30 that directs the flow of mixed fluids and imparts a centrifugal force thereto. The vane 30 is mounted within the unit 16 in a fixed position, having a diameter substantially equal to the internal diameter of the cylindrical unit 16. Additionally, the several windings or spirals of the vane 30 are carried by and project from a longitudinal, central shaft 30' the end of which is press fitted in or otherwise secured to supporting means, such as a spider 30" connected to the wall of the unit 16 as by welding or the like.

In the separator 16", droplets, if any, of the cesium which have escaped vaporization are further mixed with and move through the lithium. Turbulence plugs 31 may, if desired or required, be provided in the separator 16" to induce additional commingling of the fluids and supplement the vaporization of the cesium. When employed, these plugs 31 may be connected to and project at right angles from the inner wall of the separator 16" and/or selected faces of the spiral vane 30.

The length of the separator 16", as well as the length and pitch of the spiral vane 30 therein, will vary in each case, being sufficient in any event to effect substantially complete separation of the lithium and cesium. Due to the centrifugal action, the liquid lithium will be forced outwardly and maintained against the wall of the separator 16", while the vapor cesium will be confined at and along the longitudinal center of the separator 16". One or more openings pierce the wall of the separator 16" at its end, and each constitutes a tangentially disposed exhaust port 32 adapted to connect the return line 17 thereto whereby the lithium is recirculated in the primary loop 10 by action of the pump 12 as before. This connection of each line 17 to its port 32 may be effected in the same manner as that already described for the connection of line 15 to port 25, i.e., welded as at 25'.

The end of the separator 16" is open for connection to the fluid feed line 20 of the secondary loop 11 whereby the heated cesium vapor is delivered from the separator to the turbine 21. The turbine 21 is thereby driven and the generator 22 energized. A connection like 25' described above is preferred between the line 20 and the end of the separator 16".

From the foregoing it is now apparent that a selection of immiscible or partially miscible fluids circulated and recirculated in the primary and secondary loops 10 and 11 as described results in the substantially continuous generation of electrical energy. Moreover, by means of and through the vaporizer-separator 16 where in the immiscible or partially miscible fluids are first directly and intimately mixed and then separated for recirculation through their respective loops 10 and 11, substantially 100% heat transfer is obtainable. At the same time, construction of the vaporizer-separator 16 is such that a high degree of reliability is realized and a good life expectancy is attained since stress erosion, as well as many manufacturing problems heretofore inherent in conventional tubal heat exchangers, has been eliminated.

What is claimed is:

1. A thermal energy converting system comprising a primary fluid loop and a secondary fluid loop, immiscible alkali metal fluids in both said loops, means heating the fluid in the primary loop, fluid circulating means in both loops, a heat transfer chamber common to a selected portion of both loops, said chamber including tangentially disposed inlet ports at angles relative to each other to receive said fluids and a splash plate adjacent said ports to generate turbulence of said fluids whereby they are intimately mixed to a uniform temperature, means in communication with said chamber to receive the mixed fluids and separate them for return to their respective loops, and means converting the thermal energy in the fluid in the secondary loop into electrical energy.

2. A thermal energy converting system comprising a primary and a secondary fluid loop with immiscible circulating alkali metal fluids therein, a heat transfer chamber common to both said loops, said chamber including a fluid mixing section, fluid inlet ports communicating with said mixing section and adapted to connect said loops thereto, a nozzle associated with the port connecting at least one of said loops to discharge its fluid into the chamber at high velocity, a splash plate within the chamber disposed substantially at right angles to each said nozzle, a fluid separating section, and fluid outlet ports communicating with said fluid separating section and adapted to connect said respective loops thereto.

3. The system of claim 2 wherein said alkali metal fluids are lithium in the primary loop and cesium in the secondary loop.

4. The system of claim 2 wherein said fluid mixing section includes turbulence plugs disposed substantially transversely of the chamber.

5. The system of claim 2 wherein said fluids separating section is formed by a fixed spiral vane axially disposed therein.

6. A thermal energy converting system comprising a primary fluid loop and a secondary fluid loop, an alkali metal fluid having a relatively high boiling point temperature circulating in said primary loop, an alkali metal fluid having a relatively low boiling point temperature circulating in said secondary loop, said fluids being immiscible at the boiling temperature of the fluid in the secondary loop, means heating the fluid in said primary loop to a temperature below its boiling point and above the boiling point of the fluid in the secondary loop, a heat transfer chamber including turbulence generating means common to portions of both loops whereby the heated fluid in the primary loop is intimately mixed with the fluid in the secondary loop and the temperature of said fluid in the secondary loop is increased to its boiling point, and a turbine-driven generator in the secondary loop receiving the fluid thus boiled for conversion of the thermal energy thereof into electrical energy.

References Cited by the Examiner
UNITED STATES PATENTS

| | | | |
|---|---|---|---|
| 1,708,653 | 4/29 | Boyrie | 55—456 XR |
| 1,807,783 | 6/31 | Gay | 122—31 |
| 1,860,238 | 5/32 | Deming | 55—436 |
| 2,561,471 | 7/51 | Hatfield | 122—31 |
| 2,820,620 | 1/58 | Anderson | 122—31 XR |
| 3,032,482 | 5/62 | Shoemaker | 122—31 |

ROBERT A. O'LEARY, *Primary Examiner.*

REUBEN EPSTEIN, PERCY L. PATRICK, ROBERT A. O'LEARY, *Examiners.*